US006284397B1

(12) United States Patent
Barton

(10) Patent No.: US 6,284,397 B1
(45) Date of Patent: Sep. 4, 2001

(54) ROTARY PISTON BLOWER FOR SUPPLYING AN OXIDANT STREAM TO A FUEL CELL

(75) Inventor: Russell H. Barton, New Westminster (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 09/321,409

(22) Filed: May 27, 1999

Related U.S. Application Data

(60) Provisional application No. 60/087,312, filed on May 29, 1998.

(51) Int. Cl.[7] .................................................. H01M 8/00

(52) U.S. Cl. ................................ 429/17; 429/12; 429/13; 429/34

(58) Field of Search ................................. 429/12, 13, 17, 429/34; 418/3, 54, 172, 191, 205

(56) References Cited

U.S. PATENT DOCUMENTS 5,462,815 10/1995 Horiuchi ................................ 429/13

FOREIGN PATENT DOCUMENTS

0773188 A2 5/1997 (EP) .
1030458 5/1966 (GB) .

OTHER PUBLICATIONS

"Aerzen Rotary Piston Blower," Aerzon Canada Inc., pp. 1–12 (1995).

"Aerzen Compact I and II blowers," Aerzon Canada Inc., pp. 1–23 (1995).

*Primary Examiner*—Gabrielle Brouillette
*Assistant Examiner*—M. Wills
(74) *Attorney, Agent, or Firm*—McAndrews, Held & Malloy, Ltd.

(57) ABSTRACT

An improved rotary piston blower supplies an oxidant stream to a fuel cell. In one embodiment, the improved rotary piston blower includes cantilevered shafts. The improved rotary piston blower is also able to supply an oil-free oxidant stream to an electrochemical fuel cell. The improved rotary piston blower has fewer components, fewer seals, and is easier to fabricate, in comparison to conventional, prior art rotary piston blowers.

21 Claims, 2 Drawing Sheets

ROTARY PISTON BLOWER FOR SUPPLYING AN OXIDANT STREAM TO A FUEL CELL

CROSS-REFERENCE TO RELATED APPLICATION

This application is related to and claims priority benefits from U.S. Provisional Patent Application Serial No. 60/087,312 filed May 29, 1998, entitled "Rotary Piston Blower For Supplying An Oxidant Stream To A Fuel Cell". The '312 provisional application is incorporated herein by reference in its entirety.

FIELD OF THE IMPROVED ROTARY PISTON BLOWER

The present improved rotary piston blower provides a rotary piston blower for supplying an oxidant stream to a fuel cell. In one embodiment, an improved rotary piston blower includes cantilevered shafts.

BACKGROUND OF THE IMPROVED ROTARY PISTON BLOWER

FIG. 1 was reproduced from a catalog published by Aerzener Maschinen Fabrik GmbH ("Aerzener"), a German manufacturer of rotary piston blowers. FIG. 1 depicts a longitudinal sectional view of a prior art rotary piston blower 10. Two pistons 15 and 20 are synchronized to rotate at the same speed by timing gears 25 and 30 which are mounted on the respective piston shafts 35 and 40. Piston 15 is known as the driven piston because it is mounted on shaft 35 which extends from the housing for coupling to a motor (not shown). Piston 20 is known as a secondary piston because the rotation of piston 20 is governed by timing gears 25 and 30.

FIG. 2 was also reproduced from a catalog published by Aerzener. As shown in FIG. 2, the rotating pistons are shaped so that pistons 15 and 20 are in close proximity with each other and the piston housing without touching either one.

The piston housing has a piston cylinder 45 which has an interior surface in the general shape of two intersecting bore holes. The piston housing comprises two side plates 50 and 55 which have substantially flat interior surfaces which face the ends of the piston.

Diagrams (a) through (d) in FIG. 2 depict a cross sectional view of the inside of the piston housing looking in the direction of piston shafts 135 and 140. Pistons 115 and 120 typically comprise a body with at least two lobes as shown in FIG. 2. The contoured surfaces of lobed pistons 115 and 120 are shaped such that a contoured surface of rotating piston 115 is normally in close proximity with a contoured surface of rotating piston 120. Timing gears (not shown in FIG. 2) prevent pistons 115 and 120 from touching by ensuring that piston shafts 135 and 140 and corresponding pistons 115 and 120 all rotate at the same speed.

FIG. 2 is a series of drawings which diagrammatically depict how a fluid is blown through a rotary piston blower by showing how the pistons cooperate with one another while rotating at the same speed to compress the fluid against the piston cylinder at different angles of rotation. The process fluid enters through an inlet port 160 in piston cylinder 145 while process fluid exits through an outlet port 165 which is typically opposite inlet port 160. Pistons 115 and 120 are shaped so that the inlet fluid stream is substantially sealed from the outlet fluid stream. However, the inlet and outlet fluid streams are never completely sealed because there is a small gap between the two pistons and between the pistons and piston cylinder 145, since these components are preferably not in contact with each other. An advantage of this arrangement is that because there is no contact between the moving internal components no lubricant is required and a rotary piston blower can be used to supply oil-free fluid streams.

With reference again to FIG. 1, the piston housing of conventional rotary piston blowers comprises at least three pieces, namely piston cylinder 45, and side plates 50 and 55. In some cases, particularly for larger blowers, for ease of assembly and maintenance, piston cylinder 45 and side plates 50 and 55 may each comprise more than one piece. To provide better sealing between the piston housing components, gaskets may be used. Any known fastening devices may be used to join piston cylinder 45 with side plates 50 and 55, such as, for example, flanges with bolts and nuts or tapped holes.

Lubricated fixed bearings 70 mounted on side plate 50 support one end of shafts 35 and 40 between the piston housing and timing gears 25 and 30. The opposite end of shaft 40 is supported by floating bearing 75 which is mounted on side plate 55. A fourth shaft bearing assembly 80, which may be, for example a cylindrical roller bearing, supports shaft 35 where it extends from the housing for connection to the motor coupling. Seals 85 are provided between shaft bearings 70, 75 and 80 and side plates 50 and 55 to prevent lubricants from entering the piston housing while also preventing the fluid inside the piston housing from contaminating or blowing lubricants out of the bearings. An additional shaft seal 90 may also be provided where driven shaft 35 extends from the housing.

There are several disadvantages of the prior art rotary piston blowers which are inherent in the typical designs, one of which has been described above and illustrated in FIG. 1. For example, one disadvantage is that the piston housing is typically made from at least three pieces, namely piston cylinder 45 and side plates 50 and 55; all three of these components contribute to the proper alignment of the piston and shaft assemblies so each of these three pieces must be carefully fabricated to ensure proper alignment. In particular, side plates 50 and 55 both provide supports for bearings 70, 75 and 80 so side plates 50 and 55 both need to be accurately machined and carefully assembled with piston cylinder 45 so that piston shafts 35 and 40 and pistons 15 and 20 are properly aligned within piston cylinder 45. Misalignment of piston shafts 35 and 40 can result in unbalanced rotation and/or accelerated wear of the bearings and seals. Severe misalignment can also cause serious damage to pistons 15 and 20 and the housing if the pistons touch each other or the piston cylinder while rotating.

Another disadvantage of prior art rotary piston blowers is that since piston shafts 35 and 40 are supported on both sides of respective pistons 15 and 20, there are four shaft bearings which each require a seal to isolate the interior of the piston housing from the lubricated shaft bearings and timing gears. Known rotary piston blower designs such as the one shown in FIG. 1 must have shafts which extend from both sides of the pistons because the timing gears are located on one side of the pistons and the shaft extends from the other side of the pistons for coupling to a motor. Because rotary piston blowers are commonly used for process streams which are oil-free and sealed against contaminants, it would be beneficial to reduce the number of openings in the piston housing, and the number of seal and bearing arrangements adjacent the piston housing.

In the prior art, it is not known to use a rotary piston blower to supply an oxidant stream to a fuel cell. A rotary piston blower required for supplying an oxidant stream to a portable or low power fuel cell would generally (depending upon the power output of the fuel cell) be smaller than rotary piston blowers which are commonly available. For example, the rotary piston blowers commercially available from Aerzener have intake flow volumes between 30 cubic meters per hour (500 liters/minute) for their smallest capacity model, up to 15,000 cubic meters per hour for their largest capacity model. The flow rate required for a typical portable or low power fuel cell is in the range of approximately 6 cubic meters per hour (100 liters/minute) or less.

SUMMARY OF THE IMPROVED ROTARY PISTON BLOWER

An improved rotary piston blower has fewer components, fewer seals, and is easier to fabricate, compared to the prior art rotary piston blower shown in FIG. 1. The improved rotary piston blower is also able to supply an oil-free oxidant stream to an electrochemical fuel cell.

In particular, the improved rotary piston blower comprises:

(a) an elongated drive shaft having a longitudinal axis;

(b) a driven piston mounted on a first end of the drive shaft;

(c) a secondary shaft having a longitudinal axis parallel to the longitudinal axis of the drive shaft;

(d) a secondary piston mounted on a first end of the secondary shaft;

(e) a first timing gear mounted on the drive shaft;

(f) a second timing gear mounted on the secondary shaft wherein the first and second timing gears interlock;

(g) a piston housing enclosing the driven and secondary pistons with the piston housing comprising a piston cylinder interposed between a first side plate and a second side plate wherein the first side plate provides a mounting point for attaching a drive shaft bearing assembly for supporting a second end of the drive shaft and a mounting point for attaching a secondary shaft bearing assembly for supporting a second end of the secondary shaft, whereby the drive shaft and the secondary shaft are supported by the second ends only, and the first ends of the shafts are unsupported.

In a preferred embodiment, the first ends of the drive shaft and the secondary shaft do not extend beyond the respective end faces of the driven and secondary pistons. Because the first ends of the drive shaft and the secondary shaft are cantilevered (i.e. unsupported) it is unnecessary for the shaft ends to extend beyond the end faces of the respective pistons. This feature of the improved rotary piston blower enables the second side plate to be made flat and devoid of openings to the piston cylinders, which is another feature of the preferred embodiment of the improved rotary piston blower.

The second side plate may be made from a flat piece of metal which is shaped to cover one end opening of the piston cylinder. Compared to the prior art, it is much easier to fabricate a side plate which is flat and without mounts for supporting shaft bearings. This feature of the improved rotary piston blower reduces fabrication costs and simplifies the assembly of the piston housing since it is not necessary to align shaft bearing mounts on both sides of the piston housing.

In one embodiment of the improved rotary piston blower, the bearing assemblies which support the drive shaft and the secondary shaft respectively are roller bearings which keep the shafts properly oriented. In the preferred embodiment, improved shaft support is provided by bearing assemblies which each comprise two bearings longitudinally spaced to support each of the drive shaft and the secondary shafts. In this preferred embodiment, the spaced bearings are both located on the second ends of the respective shafts which extend from the driven and secondary pistons.

In a preferred embodiment of the improved rotary piston blower, the first and second timing gears are located on the second ends of the drive shaft and the secondary shaft, respectively (i.e. on the same end of the shafts as the bearing assemblies). In one embodiment, the timing gears may be mounted on the drive and secondary shafts in between two support bearings.

To reduce fabrication time and to improve the precision of the machining process, the first end plate and the piston cylinder may be machined from a single piece of metal. The bore for each of the pistons is on the same axis as the respective shafts so the shaft can be more accurately aligned in the piston cylinder if the shaft bearing mounts and the piston bores are machined from the same piece. A one-piece integrated side plate and piston cylinder can also be made in the same fixturing, which is to say that it is possible to machine the entire piece without re-gripping or moving the piece, which facilitates fabrication and improves accuracy.

The improved rotary piston blower may further comprise shaft seals mounted between the bearing assemblies and the interior of the piston housing. Alternatively, the bearings next to the piston side plate may be sealed bearings which may also be used in combination with additional shaft seals to isolate the lubricated timing gears. An advantage of the present improved rotary piston blower is that since the pistons are only supported from one side, there are only two shaft openings in the piston housing. Compared to the prior art blowers which have four shaft openings, only two shaft seals and/or sealed bearings are needed instead of a minimum of four.

Another advantage of the present improved rotary piston blower, or indeed scaled down conventional rotary piston blowers, is that they can provide performance characteristics which are superior to known oxidant supply devices previously used in the prior art for supplying a low pressure oxidant stream of less than 500 standard liters per minute to a fuel cell. For example, oxidant supply devices used in conventional fuel cell systems comprise vane blowers, diaphragm pumps, reciprocating pistons compressors, and linear piston compressors.

Table 1 provides a comparison of estimated efficiencies for known oxidant supply devices versus the improved rotary piston blower based upon operating conditions for a flow rate of 100 liters/minute, a pressure increase of 5 pounds per square inch for dry oil-free air.

TABLE 1

Estimated Efficiencies for Blowers and Compressors

| Type of Blower | Efficiency in watts/liter/minute |
|---|---|
| The improved rotary piston blower | 0.4 |
| Comparative Examples | |
| Vane blower | 3.2 |
| Diaphragm pump | 2.4 |
| Piston (oil-free) | 3.0 |
| Linear piston compressor | 1.0 |

The values for the vane blower and the diaphragm pump have been estimated by scaling down from efficiency values for larger commercially available models. From this table it can be determined that a rotary piston blower is approximately twice as efficient as the next most efficient commercially available compressor, namely the linear piston compressor.

Table 2 provides a comparison of the approximate weights for the same oxidant supply devices:

TABLE 2

Estimated Weights for Blowers and Compressors

| Type of Blower | Approx. Weight in Kg |
| --- | --- |
| The improved rotary piston blower | 1.04 |
| Comparative Examples | |
| Vane blower | 5.2 |
| Diaphragm pump | 11.6 |
| Piston (oil-free) | 13.6 |
| Linear piston compressor | 8.3 |

The weight for the improved rotary piston blower was measured from a prototype of the improved rotary piston blower machined from solid pieces of metal. It is expected that it will be possible to reduce the weight of a production rotary piston blower. Vane blowers and diaphragm pumps are not available in the size required for the selected operating conditions, so the estimated weights have been scaled down from larger models. With reference to Table 2 it is shown that rotary piston blowers have a weight advantage compared to other known devices for blowing or compressing a gas such as air.

Thus, a scaled down conventional rotary piston blower used in a fuel cell system offers advantages over conventional oxidant delivery devices used in such systems. However, improved rotary piston blowers as described herein offer particular advantages such as those described herein, and are particularly preferred for use in fuel cell systems because these advantages.

Accordingly, a scaled down conventional rotary piston blower or the improved rotary piston blower can be used to provide an improved oxidant supply system for an electrochemical fuel cell wherein the system further comprises an electric motor coupled to an elongated drive shaft extending from the blower, and a filter mounted upstream of an intake port of the blower.

In a preferred embodiment of the improved rotary piston blower, the improved oxidant supply system comprising a rotary piston blower is provided for a solid polymer fuel cell system. The rotary piston blower is particularly suited for this application because fuel cells require clean oil-free air because oil and other impurities can reduce fuel cell performance by contaminating fuel cell components such as the electrocatalyst and the electrolyte. A further advantage of using the improved oxidant supply system for supplying an oxidant stream to a fuel cell is that portable and low power fuel cell systems typically require low pressure air which a rotary piston blower can provide. Portable or low power fuel cells may be defined as fuel cells which have a power output less than approximately 20 kilowatts and/or which require an oxidant flow of less than approximately 100 standard litres per minute.

DETAILED DESCRIPTION OF THE PREFERRED EMBODIMENTS

Figure 3:
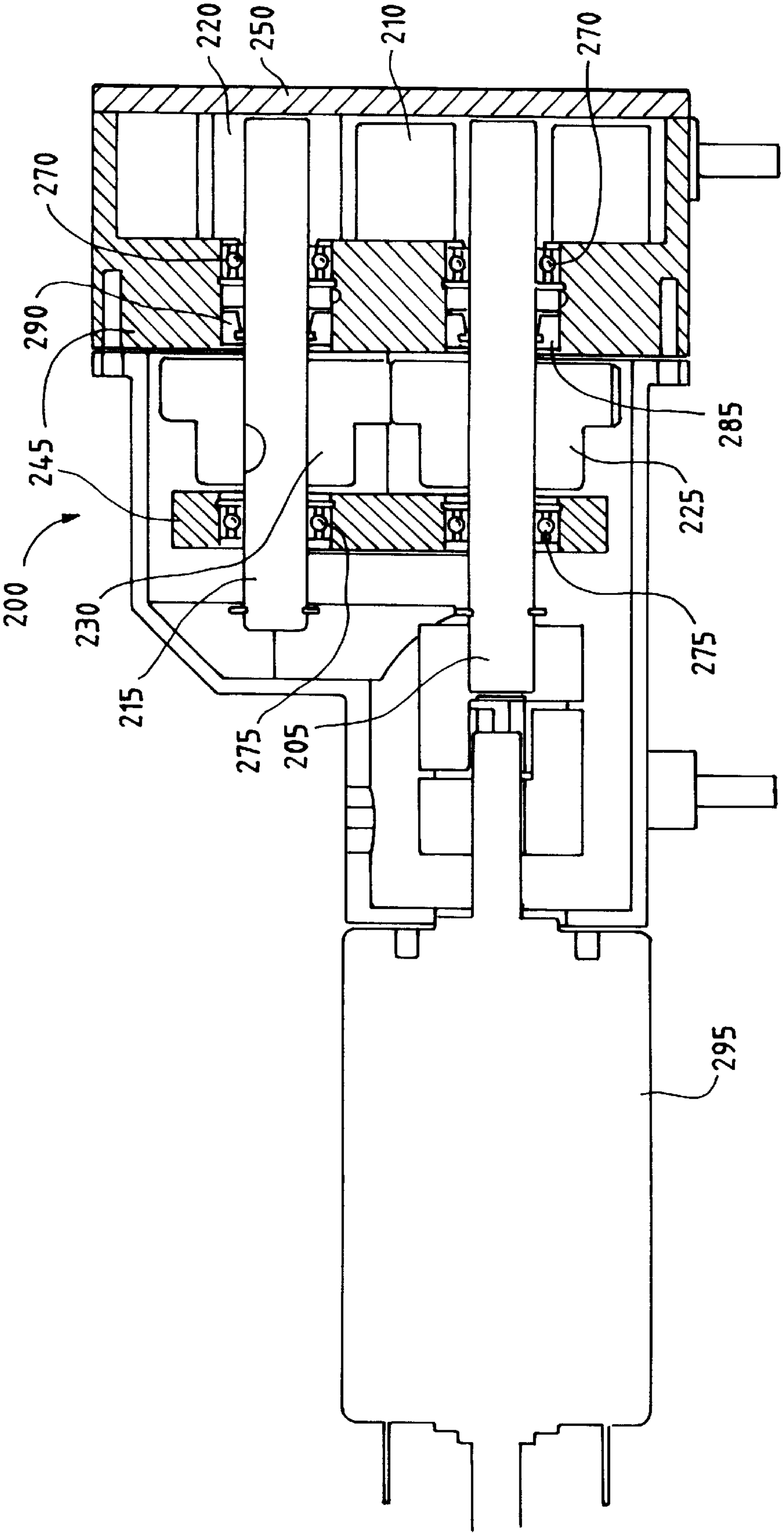
FIG. 3 is a longitudinal section view of an embodiment of the improved rotary piston blower of the present improved rotary piston blower.

FIG. 3 shows a longitudinal sectional view of an improved rotary piston blower 200 which incorporates an embodiment of each of the features of the present improved rotary piston blower. An elongated drive shaft 205 extends from driven piston 210 and secondary shaft 215 extends from secondary piston 220. Interlocking timing gears 225 and 230 are mounted on shafts 205 and 215 respectively. In the preferred embodiment timing gears 225 and 230 have interlocking teeth. The piston housing comprises a unitary piston cylinder and side plate 245 and a separate side plate 250. In the illustrated embodiment, each shaft 205 and 215 is supported by an inside bearing 270 and an outside bearing 275. Both of bearings 270 and 275 are mounted onto supports which are integral to the unitary side plate and piston cylinder 245. Two shaft seals 285 and 290 provide sealing between the interior of the piston cylinder 245 and timing gears 225 and 230. Inside bearings 270 are sealed bearings to prevent any lubricants from entering the interior of the piston housing. In the alternative, shaft seals 285 and 290 may be located between inside bearings 270 and the piston cylinder in which case, inside bearings 270 need not be sealed bearings.

Figure 1:
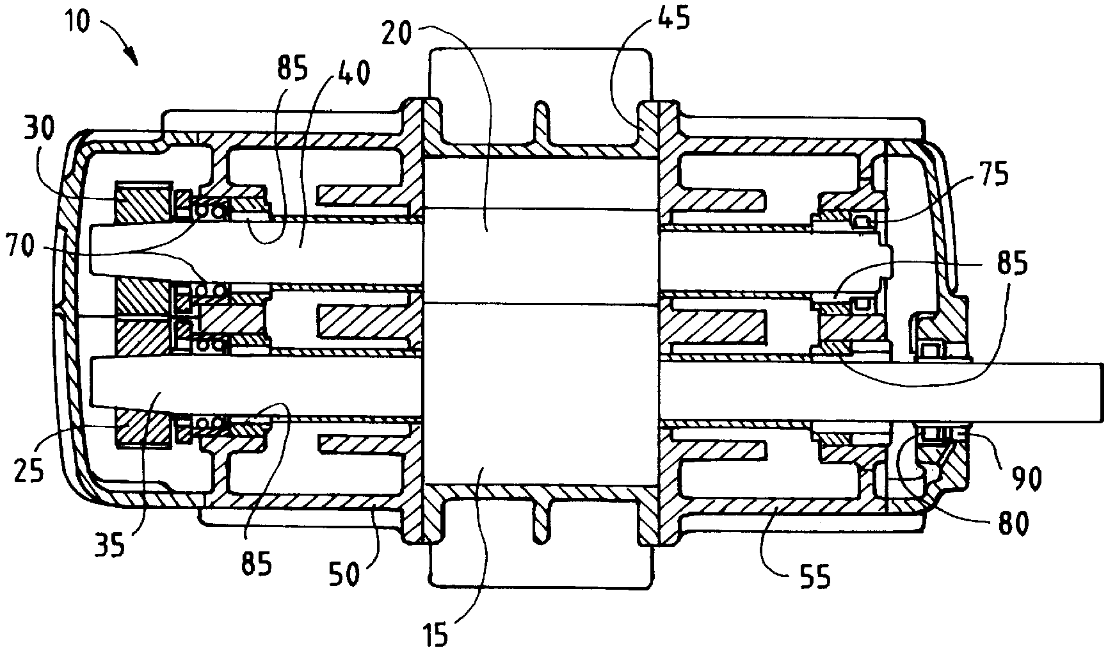
FIG. 1 is a longitudinal section view of a prior art rotary piston blower.
Figure 2A:
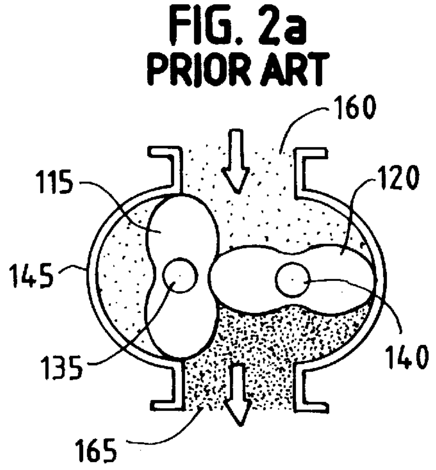
FIG. 2 is a series of sequential diagrams which depict a lateral section view of a prior art piston housing showing how the pistons interact at different degrees of rotation.
Figure 2B:
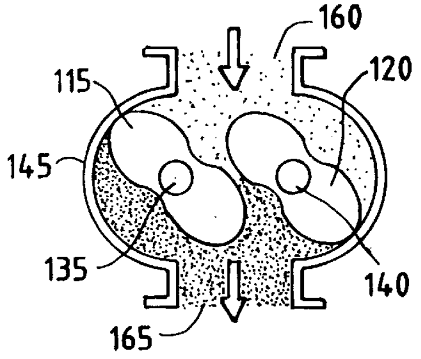
Figure 2C:
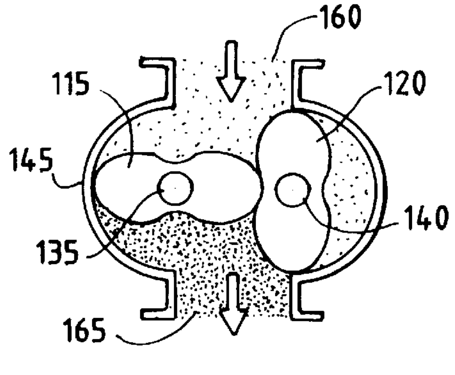
Figure 2D:
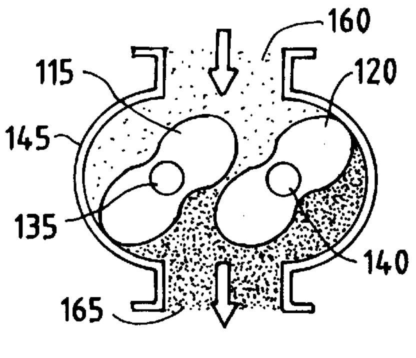

FIG. 3 further illustrates some of the advantages of the improved rotary piston blower 200. For example, the improved rotary piston blower 200 requires two less shaft seals 285 compared to the four seals 85 needed by prior art rotary piston blowers such as the blower depicted in FIG. 1. FIG. 3 also shows that the improved rotary piston blower 200 also has a simpler side plate 250 compared to prior art side plate 55.

A motor 295 is coupled to drive shaft 205.

While the improved rotary piston blower has been described for use with a particular application, namely supplying an oxidant stream to a fuel cell, it will be understood by those skilled in the art that the improved rotary piston blower may also be used for other applications which presently use prior art rotary piston blowers or applications which require the supply of low pressure oil-free fluids such as air.

Furthermore, while particular elements, embodiments and applications of the present improved rotary piston blower have been shown and described, it will be understood, of course, that the improved rotary piston blower is not limited thereto since modifications may be made by those skilled in the art without departing from the spirit and scope of the present disclosure, particularly in light of the foregoing teachings.

What is claimed is:

1. An improved rotary piston blower comprising:

an elongated drive shaft having a longitudinal axis;

a driven piston mounted on a first end of said drive shaft;

a secondary shaft having a longitudinal axis parallel to said longitudinal axis of said drive shaft;

a secondary piston mounted on a first end of said secondary shaft;

a first timing gear mounted on said drive shaft;

a second timing gear mounted on said secondary shaft wherein said first and second timing gears interlock;

a piston housing enclosing said driven and secondary pistons, said piston housing comprising a unitary piston cylinder and a first side plate, said piston housing further comprising a second side plate, wherein said first side plate provides a mounting point for attaching a drive shaft bearing assembly for supporting a second end of said drive shaft and a mounting point for attaching a secondary shaft bearing assembly for supporting a second end of said secondary shaft, whereby said drive shaft and said secondary shaft are supported by said second ends only, and said first ends are unsupported.

2. The rotary piston blower of claim 1 wherein said second side plate has a surface facing the interior of said piston housing wherein said surface is devoid of openings.

3. The rotary piston blower of claim 1 wherein said first and second timing gears are located on said second ends of said drive shaft and said secondary shaft, respectively.

4. The rotary piston blower of claim 1 wherein said drive shaft bearing assembly and said secondary shaft bearing assembly each comprise at least two bearings spaced longitudinally along said drive shaft and said secondary shaft respectively.

5. The rotary piston blower of claim 1 wherein said first ends of said drive shaft and said secondary shaft do not extend beyond the end faces of said driven and secondary pistons respectively.

6. The rotary piston blower of claim 1 further comprising shaft seals between said first and second timing gears and the interior of said piston housing.

7. The rotary piston blower of claim 1 further comprising shaft seals between said bearing assemblies and the interior of said piston housing.

8. The rotary piston blower of claim 1 wherein said bearing assemblies comprise sealed bearings adjacent the interior of said piston housing.

9. An improved oxidant supply system for an electrochemical fuel cell comprising a rotary piston blower, an electric motor coupled to an elongated drive shaft having a longitudinal axis extending from said blower, and a filter mounted upstream of an intake port of said blower.

10. The oxidant supply system of claim 9 wherein said rotary piston blower further comprises:

a driven piston mounted on a first end of said drive shaft;

a secondary shaft having a longitudinal axis parallel to said longitudinal axis of said drive shaft;

a secondary piston mounted on a first end of said secondary shaft;

a first timing gear mounted on said drive shaft;

a second timing gear mounted on said secondary shaft wherein said first and second timing gears interlock;

a piston housing enclosing said driven and secondary pistons, said piston housing comprising a piston cylinder interposed between a first side plate and a second side plate wherein said first side plate provides a mounting point for attaching a drive shaft bearing assembly for supporting a second end of said drive shaft and a mounting point for attaching a secondary shaft bearing assembly for supporting a second end of said secondary shaft, whereby said drive shaft and said secondary shaft are supported by said second ends only, and said first ends are unsupported.

11. The oxidant supply system of claim 9 wherein said electrochemical fuel cell is a solid polymer electrolyte fuel cell.

12. The oxidant supply system of claim 11 wherein said electrochemical fuel cell is a portable fuel cell which has a power output of less than 20 kilowatts.

13. The oxidant supply system of claim 11 wherein said blower has an intake flow volume of less than 100 standard liters per minute.

14. An improved rotary piston blower comprising:

an elongated drive shaft having a longitudinal axis;

a driven piston mounted on a first end of said drive shaft;

a secondary shaft having a longitudinal axis parallel to said longitudinal axis of said drive shaft;

a secondary piston mounted on a first end of said secondary shaft;

a first timing gear mounted on said drive shaft;

a second timing gear mounted on said secondary shaft wherein said first and second timing gears interlock;

a piston housing enclosing said driven and secondary pistons, said piston housing comprising a piston cylinder interposed between a first side plate and a second side plate wherein said first side plate provides a mounting point for attaching a drive shaft bearing assembly for supporting a second end of said drive shaft and a mounting point for attaching a secondary shaft bearing assembly for supporting a second end of said secondary shaft, whereby said drive shaft and said secondary shaft are supported by said second ends only, and said first ends are unsupported; and shaft seals between said first and second timing gears and the interior of said piston housing.

15. The rotary piston blower of claim 14 further comprising shaft seals between said bearing assemblies and the interior of said piston housing.

16. The rotary piston blower of claim 15 wherein said bearing assemblies comprise sealed bearings adjacent the interior of said piston housing.

17. A method for supplying oxidant to a fuel cell, said fuel cell comprising a rotary piston blower, an electric motor coupled to an elongated drive shaft having a longitudinal axis extending from said rotary piston blower, and a filter mounted upstream of an intake port of said rotary piston blower, said method comprising the step of using said rotary piston blower to supply said oxidant to said fuel cell.

18. The method of claim 17 wherein said rotary piston blower further comprises a driven piston mounted on a first end of said drive shaft;

a secondary shaft having a longitudinal axis parallel to said longitudinal axis of said drive shaft;

a secondary piston mounted on a first end of said secondary shaft;

a first timing gear mounted on said drive shaft;

a second timing gear mounted on said secondary shaft wherein said first and second timing gears interlock; and a piston housing enclosing said driven and secondary pistons, said piston housing comprising a piston cylinder interposed between a first side plate and a second side plate wherein said first side plate provides a mount for a drive shaft bearing assembly for supporting a second end of said drive shaft and a mount for a secondary shaft bearing assembly for supporting a second end of said secondary shaft, whereby said drive shaft and said secondary shaft are supported by said second ends only, and said first ends are unsupported.

19. The method of claim 17 wherein said fuel cell is a solid polymer electrolyte fuel cell.

20. The method of claim 19 wherein said fuel cell is a portable fuel cell which has a power output of less than 20 kilowatts.

21. The method of claim 19 wherein said rotary piston blower provides an intake flow volume of less than 100 standard liters per minute.

* * * * *

UNITED STATES PATENT AND TRADEMARK OFFICE

CERTIFICATE OF CORRECTION

PATENT NO. : 6,284,397 B1
DATED : September 4, 2001
INVENTOR(S) : Russell H. Barton It is certified that error appears in the above-identified patent and that said Letters Patent is hereby corrected as shown below:

<u>Column 5,</u>
Line 31, replace "because" and insert -- due to --.
Line 62, delete "of the present improved".
Line 63, delete "rotary piston blower".

<u>Column 8,</u>
Line 23, delete "15" and insert -- 14 --.

Signed and Sealed this

First Day of October, 2002

*Attest:*

JAMES E. ROGAN

*Attesting Officer*

*Director of the United States Patent and Trademark Office*